United States Patent [19]
Adams

[11] Patent Number: 5,818,840
[45] Date of Patent: Oct. 6, 1998

[54] ASYMMETRIC ATM SWITCH

[75] Inventor: Michael B. Adams, Castle Rock, Colo.

[73] Assignee: Time Warner Entertainment Co. L.P., Stamford, Conn.

[21] Appl. No.: 572,146

[22] Filed: Dec. 14, 1995

[51] Int. Cl.$^6$ ............................. H04L 12/18; H04L 12/56
[52] U.S. Cl. ............................................ 370/395; 370/398
[58] Field of Search ..................................... 370/395, 397, 370/398, 399, 409, 419, 396; 348/7, 8, 10, 6, 13, 12, 714, 715; 455/4.1, 4.2, 5.1; 395/550, 425, 200

[56] References Cited

U.S. PATENT DOCUMENTS

| | | |
|---|---|---|
| 3,956,717 | 5/1976 | Fisher et al. . |
| 4,214,316 | 7/1980 | Lipsky . |
| 4,506,387 | 3/1985 | Walter . |
| 4,530,008 | 7/1985 | McVoy . |
| 4,553,161 | 11/1985 | Citta . |
| 4,592,546 | 6/1986 | Fascenda et al. . |
| 4,823,386 | 4/1989 | Dumbauld et al. . |
| 4,991,208 | 2/1991 | Walker et al. . |
| 5,046,090 | 9/1991 | Walker et al. . |
| 5,093,718 | 3/1992 | Hoarty et al. . |

(List continued on next page.)

OTHER PUBLICATIONS

Adams, Michael, "Network Design and Implementation of a large–scale, ATM, Multimedia Network," *Engineer Conference Notes* from Networldsm+Interop® 95, Las Vegas, NV (Mar. 27–31, 1995).

Adams, Michael, "Real Time MPEG Asset Delivery over ATM," *NCTA Technical Papers*, 1995:315–326 (1995).

News Release, "Time Warner Introduces World's First Full Service Network in Orlando," TimeWarner Cable Full Service Network, Maitland, FL, 32751 (Dec. 14, 1994).

Product Information Package from Wink Communications, 2061 Challenger Drive, Alameda, CA 94501 (1995).

Request for Proposals, "Development of a Full Service Network: A request by Time Warner for assistance in building a full service telecommunications network" (Feb. 11, 1993), Time Warner Cable, Denver, CO.

Vecchi, Mario P., and Adams, Michael, "Traffic Management for Highly Interactive Transactional System," *NCTA Technical Papers*, 1995:258–266 (1995).

*Primary Examiner*—Ajit Patel
*Attorney, Agent, or Firm*—H. L. Knearl; Holland & Hart llp

[57] ABSTRACT

One embodiment of the invention is an ATM switch comprising a switch fabric, a controller, a buffer, a plurality of input line cards and a plurality of output line cards. The input line cards comprise input connectors and output connectors, with the number of input line card input connectors exceeding the number of input line card output connectors, and the output line cards comprising output connectors and input connectors, with the number of output line card output connectors exceeding the number of output line card input connectors. In another embodiment, the invention is an ATM switch comprising a switch fabric, a controller, a buffer, a plurality of input line cards and a plurality of output line cards, with the input line cards comprising input connectors but no output connectors and the line output line cards comprising output connectors but no input connectors. The invention is also drawn to a line card having either an input switch interface or an output switch interface. The invention also includes communication networks employing these ATM switches together with an application source, information stream carriers and a plurality of user stations. The application source includes circuit for generating a forward ATM information stream intended for at least one of the user stations and circuit for receiving a reverse information stream from the one user station. Each user station comprises circuit for receiving an ATM information stream from the application source and for sending an information stream to the application source.

11 Claims, 7 Drawing Sheets

U.S. PATENT DOCUMENTS

| | | |
|---|---|---|
| 5,168,353 | 12/1992 | Walker et al. . |
| 5,220,420 | 6/1993 | Hoarty et al. . |
| 5,225,267 | 7/1993 | Hansen et al. . |
| 5,311,423 | 5/1994 | Clark . |
| 5,343,239 | 8/1994 | Lappington et al. . |
| 5,357,276 | 10/1994 | Banker et al. . |
| 5,361,091 | 11/1994 | Hoarty et al. . |
| 5,383,112 | 1/1995 | Clark . |
| 5,390,337 | 2/1995 | Jelinek et al. . |
| 5,394,394 | 2/1995 | Crowther et al. . |
| 5,400,402 | 3/1995 | Garfinkle . |
| 5,412,642 | 5/1995 | Nunokawa ............................ 370/395 |
| 5,412,720 | 5/1995 | Hoarty . |
| 5,421,031 | 5/1995 | De Bey . |
| 5,422,674 | 6/1995 | Hooper et al. . |
| 5,423,555 | 6/1995 | Kidrin . |
| 5,425,027 | 6/1995 | Baran . |
| 5,426,699 | 6/1995 | Wunderlich et al. . |
| 5,442,700 | 8/1995 | Snell et al. . |
| 5,446,726 | 8/1995 | Rostoker et al. . |
| 5,452,297 | 9/1995 | Hiller et al. . |
| 5,453,979 | 9/1995 | Schibler et al. . |
| 5,455,701 | 10/1995 | Eng et al. . |
| 5,455,820 | 10/1995 | Yamada . |
| 5,455,825 | 10/1995 | Lauer et al. . |
| 5,459,722 | 10/1995 | Sherif . |
| 5,475,679 | 12/1995 | Munter ................................... 370/395 |
| 5,500,851 | 3/1996 | Kozaki et al. ......................... 370/395 |
| 5,513,174 | 4/1996 | Punj ....................................... 370/395 |

ASYMMETRIC ATM SWITCH

FIELD OF THE INVENTION

This invention relates generally to ATM switches, to line cards for ATM switches and to communication networks incorporating ATM switches. In particular, the invention relates to asymmetric ATM switches, their line cards and communication networks which incorporate them.

BACKGROUND OF THE INVENTION

Asynchronous Transfer mode (ATM) is a network protocol that enables high speed transmission of many types of data, including voice data, video data and computer files. The ATM protocol provides for data cells made up of a data portion, a header portion and a trailer portion. The header contains a virtual channel identifier and a virtual path identifier which identify the data cell's path through the ATM switch.

In the ATM switching system, an ATM switch performs switching for routing each input ATM cell to a particular output port. General information regarding ATM cells and ATM switching may be found in U.S. Pat. No. 5,455,820 and U.S. Pat. No. 5,446,726, which are incorporated herein by reference.

Summary of the Invention While the ATM protocol has long been used in telephony applications, ATM switching has now been proposed for use in interactive television networks. In interactive cable television networks, the quantity of information transmitted in the forward direction greatly exceeds the quantity of information in the reverse direction. Standard symmetric ATM switches at the head ends of such networks, therefore, have much more capacity in the reverse direction than is necessary to provide the network services. Thus, there is an opportunity to reduce the cost of ATM switches in such networks by eliminating the switches' overcapacity in the reverse direction.

One embodiment of the invention is an ATM switch comprising a switch fabric, a controller, a buffer, a plurality of input line cards and a plurality of output line cards. The input line cards comprise input connectors and output connectors, with the number of input line card input connectors exceeding the number of input line card output connectors, and the output line cards comprising output connectors and input connectors, with the number of output line card output connectors exceeding the number of output line card input connectors.

In another embodiment, the invention is an ATM switch comprising a switch fabric, a controller, a buffer, a plurality of input line cards and a plurality of output line cards, with the input line cards comprising input connectors but no output connectors and the line output line cards comprising output connectors but no input connectors. The invention is also drawn to a line card having either an input switch interface or an output switch interface.

The invention also includes communication networks employing these ATM switches together with an application source, information stream carriers and a plurality of user stations. The application source includes means for generating a forward ATM information stream intended for at least one of the user stations and means for receiving a reverse information stream from the one user station. Each user station comprises means for receiving an ATM information stream from the application source and for sending an information stream to the application source.

BRIEF DESCRIPTION OF THE DRAWINGS

The invention is described in further detail below with reference to the drawings.

DETAILED DESCRIPTION OF THE PREFERRED EMBODIMENTS

This invention optimizes ATM switches for use in communication networks in which information streams are sent more in one direction than in another. The size and complexity of ATM switches for such networks can be reduced by reducing the number of input connectors on one side of the ATM switch and reducing the number of output connectors on the other side of the ATM switch.

Figure 1:
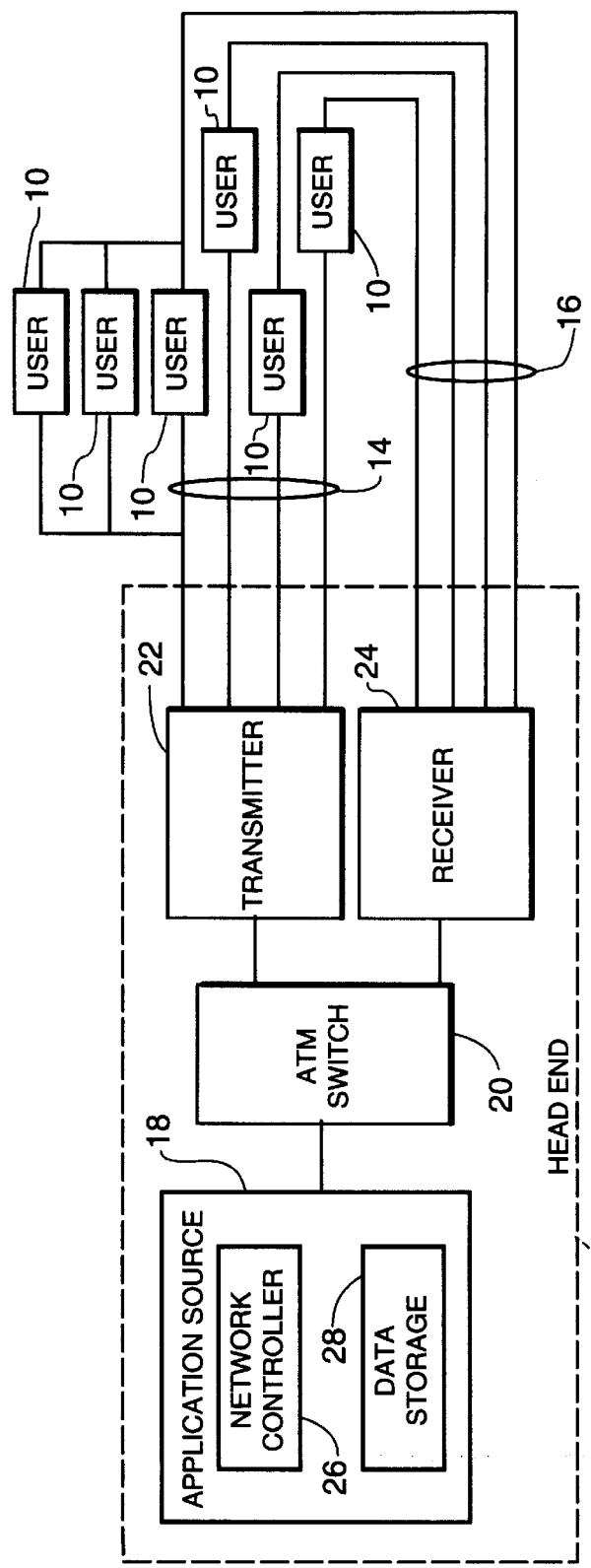
FIG. 1 is a block diagram of a communication network according to one embodiment of this invention.

FIG. 1 is a block diagram of a communication network according to one embodiment of this invention. In this network, a plurality of user stations 10 receive information streams from a network head end 12 via forward signal carriers 14. The user stations send information back to the network head end via return signal carriers 16.

Within the head end 12 are an application source 18, a transmitter 22 connected to forward signal carriers 14, and an ATM switch 20 connecting the application source to the transmitter. A receiver 24 receives information streams from return signal carriers 16 and supplies these return information streams to application source 18 via ATM switch 20. The application source includes a network controller 26 for controlling the sending and receiving of application information streams and data storage 28 for storing applications.

Figure 2:
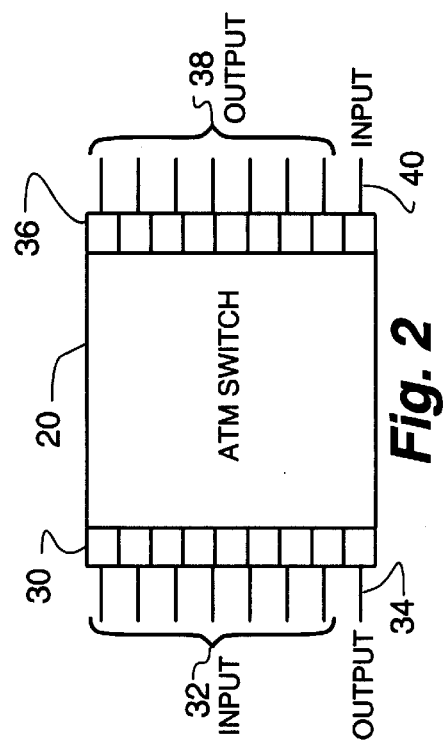
FIG. 2 is a schematic diagram of the ATM switch shown in FIG. 1.

FIG. 2 is a schematic diagram of the ATM switch shown in FIG. 1. ATM switch 20 is asymmetric. In other words, on its upstream side 30, ATM switch 20 has more input connectors 32 than output connectors 34, and on its downstream side 36 ATM switch 20 has more output connectors 38 than input connectors 40.

Figure 3B:
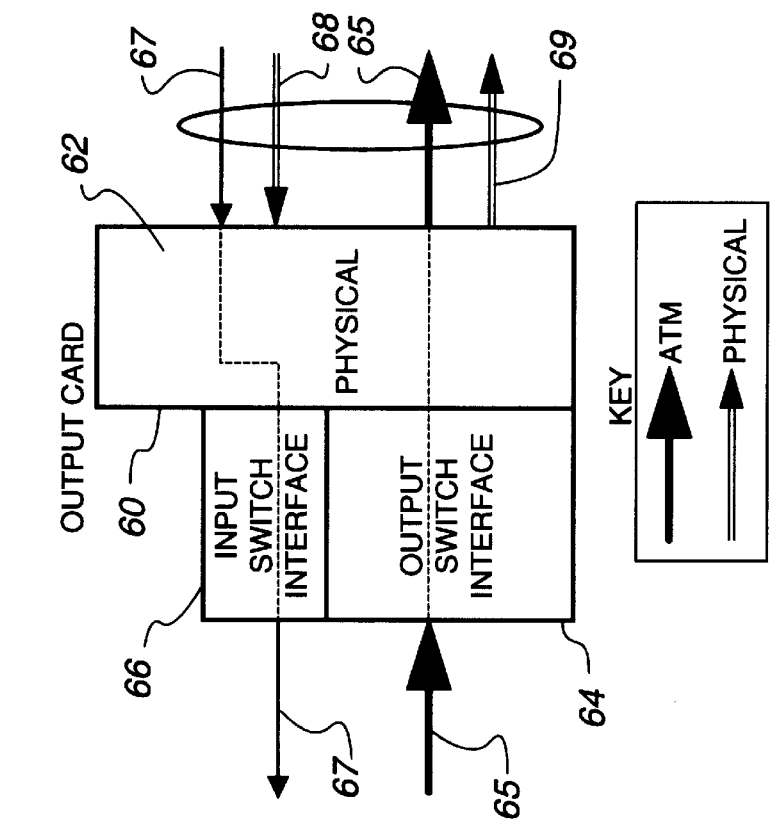
FIGS. 3(a) and 3(b) show a preferred embodiment of input and output line cards for use with an asymmetric ATM switch.
Figure 3A:
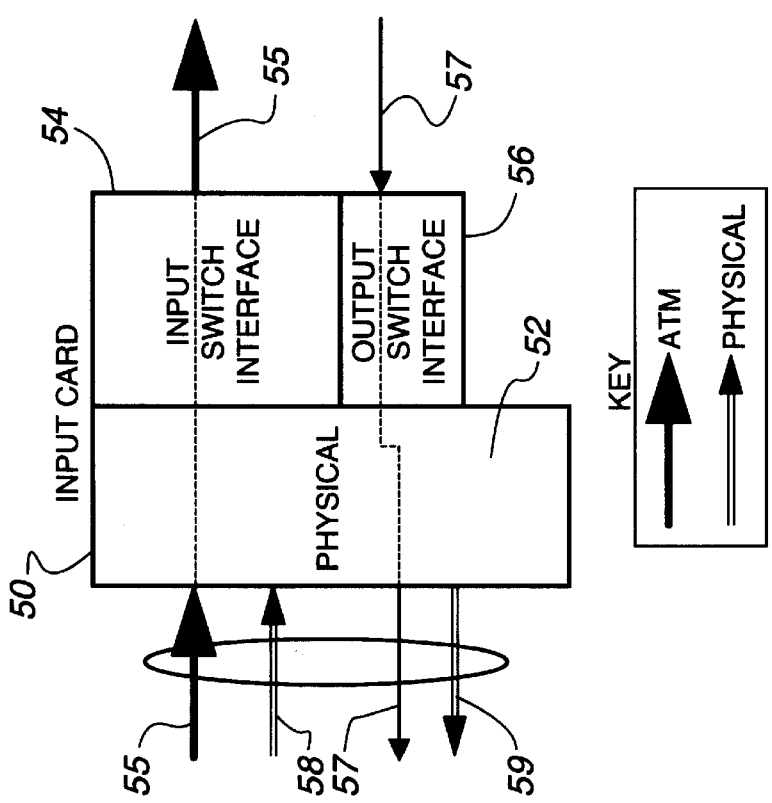

FIGS. 3(a) and 3(b) show a preferred embodiment of input and output line cards for use with an asymmetric ATM switch. As shown in FIG. 3(a), input line card 50 has three basic components: the physical layer connection 52 (e.g., a SONET (Synchronous Optical Network) OC-3 link); an input switch interface 54; and an output switch interface 56. Arrows 55 and 57 indicate the flow of ATM cells into and out of line card 50, respectively. Arrows 58 and 59 represent the physical layer interface (from the OSI 7-layer model).

Likewise, FIG. 3(b) depicts an output line card 60 with its physical layer connection 62, output switch interface 64 and input switch interface 66. Arrows 65 and 67 represent the flow of ATM cells out of and into line card 60, and arrows 68 and 69 represent the physical layer interface. The relative sizes of the interfaces and ATM arrows in FIGS. 3(a) and (b) emphasize the differences in flow rate of ATM cell streams in the upstream and downstream directions.

Line cards 50 and 60 may be implemented by modifying a commercially available line card, such as an AT&T Globeview 2000 switch. For example, the output switch interface logic of the input line card 50 can be modified to operate at a fraction of its original rate, specifically, the ratio of the number of output connectors (ports) to the number of input connectors (ports). For purposes of this invention, the likely range of this fraction is between ¼ ⅟₃₂ with ⅟₁₆ being the most preferable ratio of output connectors to input connectors (and input switch interface logic rate to output switch interface logic rate) for purposes of an interactive television network, for example. The ATM payload transmitted to the physical interface would therefore be a fraction of the physical interface capacity. An idle cell generator in the physical layer connection makes up for the difference in logic rate.

Likewise, the output line card 60 can be constructed from a conventional line card by modifying the input switch interface logic to operate at a fraction of its original rate, specifically, the ratio of input connectors (ports) to the number of output connectors (ports). Once again, for purposes of this invention, the likely range of this fraction is between ¼ and ⅟₃₂, with ⅟₁₆ being the most preferable ratio of input connectors to output connectors (and output switch interface logic rate to input switch interface logic rate) for purposes of an interactive television network, for example. If ATM payload is received by the physical layer interface at a greater rate than the input switch interface can accommodate, the excess ATM cells are discarded by the line card.

Figure 4:
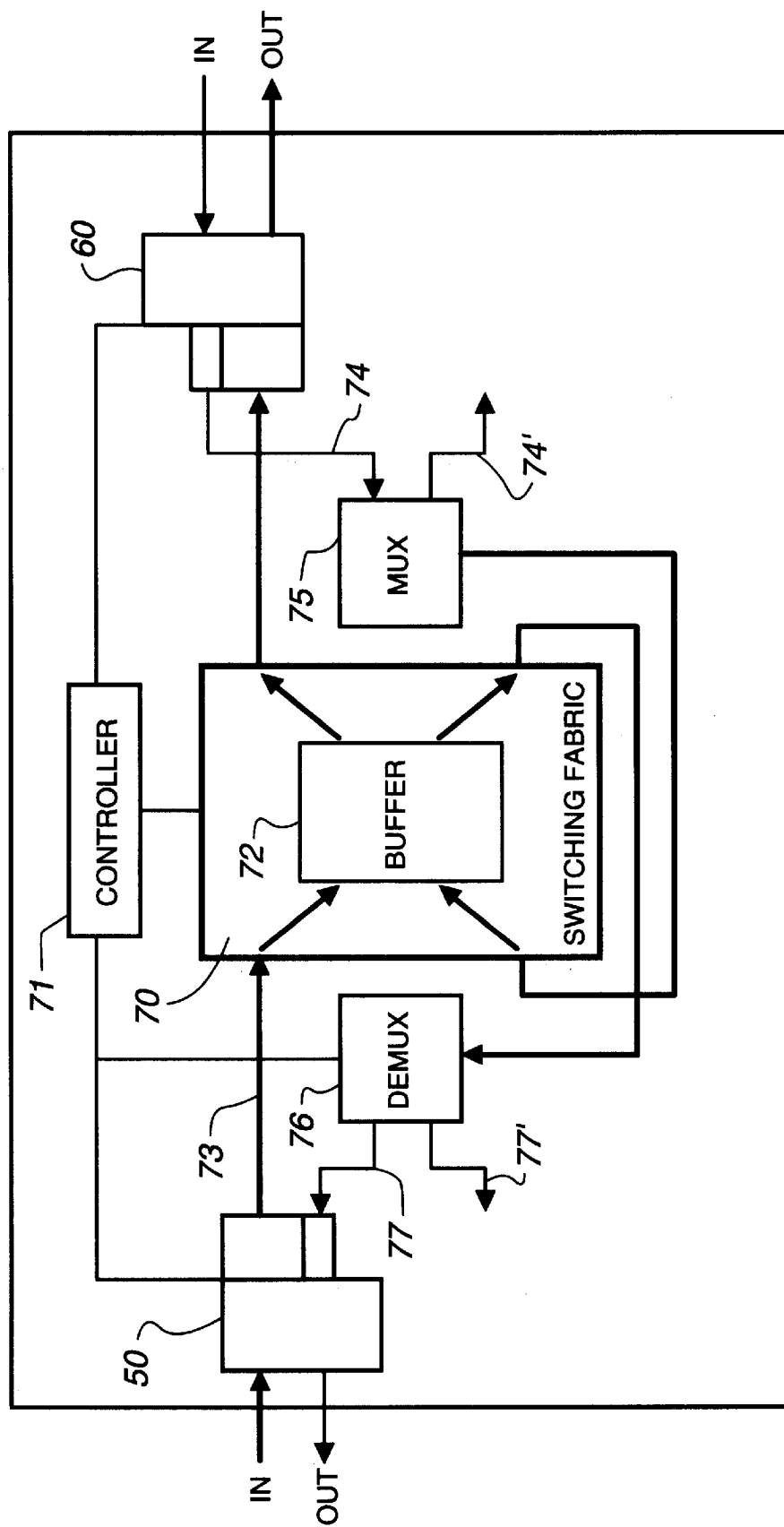
FIG. 4 is a schematic drawing showing input and output line cards in use with an ATM switch.

FIG. 4 is a schematic drawing showing line cards 50 and 60 in use with an ATM switch 20. It should be understood that in most cases there will be many input and output line cards on the upstream and downstream sides, respectively, of the ATM switch. The ATM switch 20 consists of a switching fabric 70, a controller 71, a buffer 72, a multiplexer 75 and a demultiplexer 76. The ATM switch interacts with the line card interfaces to route ATM cells according to the routing instructions in the cell headers. ATM cells from input line card 50 (shown schematically as arrow 73) pass into the switching fabric and buffer, then out to output line card 60, as shown. Return ATM cells pass from output line card 60 (shown schematically as arrow 74) into a multiplexer 75, through the switching fabric and into a demultiplexer 76 before passing through input line card 50 (arrow 77). ATM cell streams from other output line cards to multiplexer 75 are shown schematically as arrow 74', and ATM cell streams from demultiplexer 76 to other input line cards are shown schematically as arrow 77'. Multiplexer 75 combines the low-rate ATM cells from output line card 60 and any other output line cards into a single high-rate output which is connected to one input port of the switching fabric. Demultiplexer 76 has a low-rate output for the output switch interface of each input line card 50. Switch controller 71 controls cell routing at the input line card 50, the switching fabric, the output line card 60 and the demultiplexer 76. The physical layer interface to the input and output line cards (e.g., SONET) is not shown in FIG. 4.

By way of example, an ATM switch with 16 input ports and 16 output ports configured according to this embodiment of the invention would have 15 input line cards connected to 15 switch input ports and 15 output line cards connected to 15 switch output ports. A single demultiplexer having 15 outputs would be connected to one of the switch's output ports, and a multiplexer with 15 inputs would be connected to one of the switch's input ports.

Figure 5:
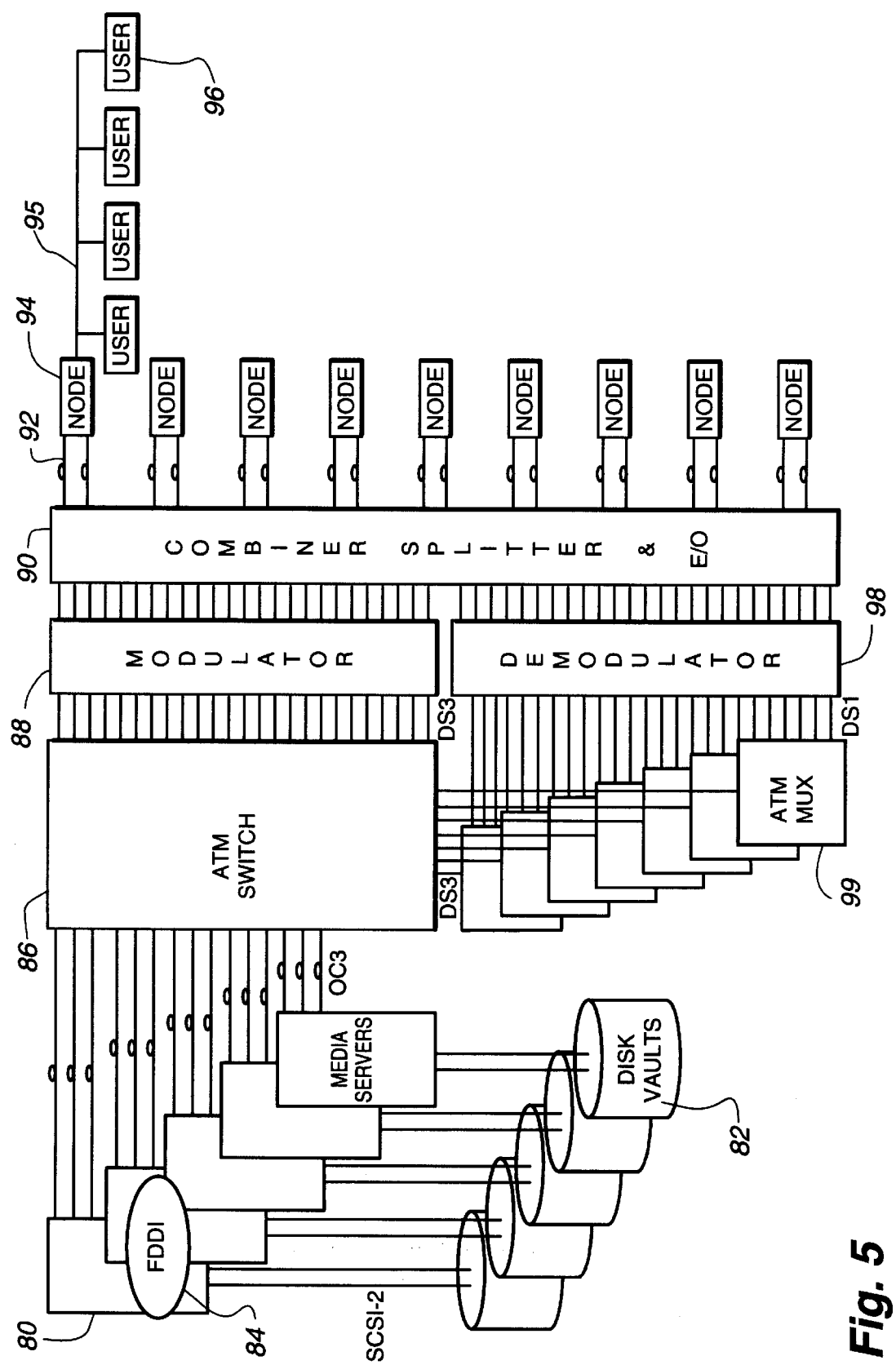
FIG. 5 is a schematic representation of a communication network using the asymmetric ATM switch and line cards of this invention.

FIG. 5 is a schematic representation of a communication network using the asymmetric ATM switch and line cards of this invention. The network shown in FIG. 5 provides broadcast and interactive applications (such as video-on-demand, home shopping and interactive games) to user stations 96. In this network, the application source is a plurality of media servers 80 (such as Silicon Graphics Challenge XLs) communicating with a plurality of disk vaults 82 (also SGI Challenge XL) using fast and wide SCSI-2 interfaces. In this embodiment of the network, the media servers are also interconnected by an FDDI ring 84. This ring is used to transfer media content to the disk vaults and to collect billing records from the servers. The FDDI ring is optional and does not form an essential part of this invention. The user stations each include a processor (not shown) for receiving ATM information streams from the head end and for returning ATM information streams to the head end. The user stations may be configured as taught in copending U.S. patent application titled "A Method and Apparatus for Enticing a Passive Television Viewer By Automatically Playing Promotional Presentations of Selectable Options in Response to the Viewer's Inactivity" filed concurrently with this application. The disclosure of this patent application is incorporated herein by reference.

The media servers 80 are connected to the upstream side of an ATM switch 86 via SONET OC-3 links. The ATM switch 86, in turn, connects to a bank of QAM-64 modulators 88 (available from Scientific Atlanta) via DS-3 links. The modulators' outputs are fed to a combiner/splitter 90 which feeds the modulated information streams through a laser transmitter to fiber optic nodes 94 via fiber optic cables 92. Each node 94 translates the optical signal to a modulated RF signal for transmission on standard coaxial cable 95 to a plurality of user stations 96.

Each node 94 also receives return information streams via RF signals on the coaxial cables. The node 94 translates the RF signal to an optical signal via a return laser and sends the information stream to the head end via the fiber optic cables 92. The combiner/splitter 90 feeds the return information streams into demodulators 98 and ATM multiplexers 99, which communicate with the ATM switch 86 via DS-3 connections, then back to the media servers 80 via the OC-3 connections.

In the network shown in FIG. 5, the bandwidth of forward information streams greatly exceeds the bandwidth of return information streams. The ATM switch 86 is therefore an asymmetric ATM switch as shown in FIGS. 3 and 4, i.e., ATM switch 86 has many more inputs on its upstream side 85 than outputs on its upstream side and many more outputs on its downstream side 87 than inputs on its downstream side. Specifically, most of the OC-3 links between ATM switch 86 and media servers 80 connect to inputs on the upstream side of ATM switch 86, and most of the DS-3 links on the downstream side of ATM switch 86 connect to outputs on the downstream side of ATM switch 86.

Other aspects of a communication network suitable for use with the asymmetric ATM switches of this invention are described in a U.S. patent application filed concurrently with this application titled "A Method for Message Addressing in a Full Service Network." The disclosure of that patent application is incorporated herein by reference.

Figure 6:
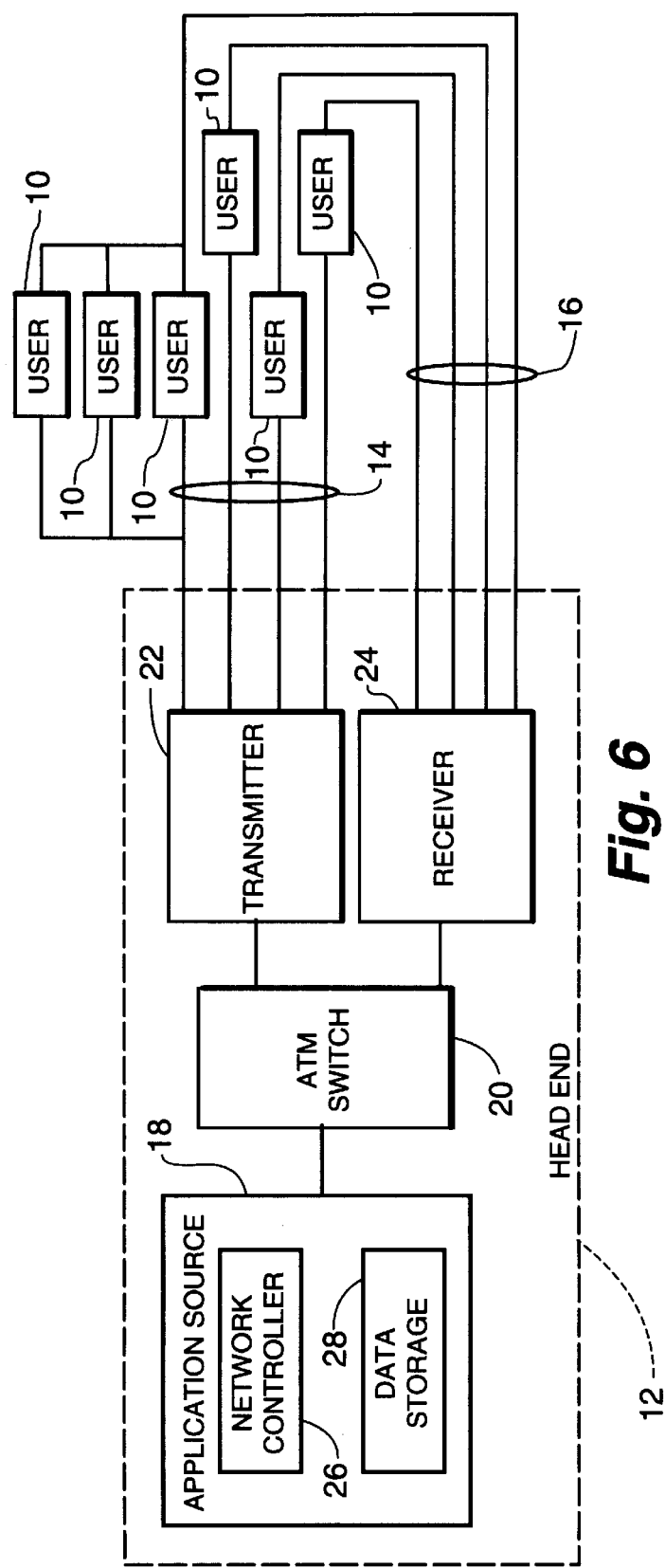
FIG. 6 is a block diagram showing another embodiment of this invention.

FIG. 6 is a block diagram showing another embodiment of this invention. In this embodiment, instead of delivering return information streams to the ATM switch 20, the return signal carriers lead directly to the application source 18. In this embodiment, ATM switch 20 is completely unidirectional.

Figure 7:
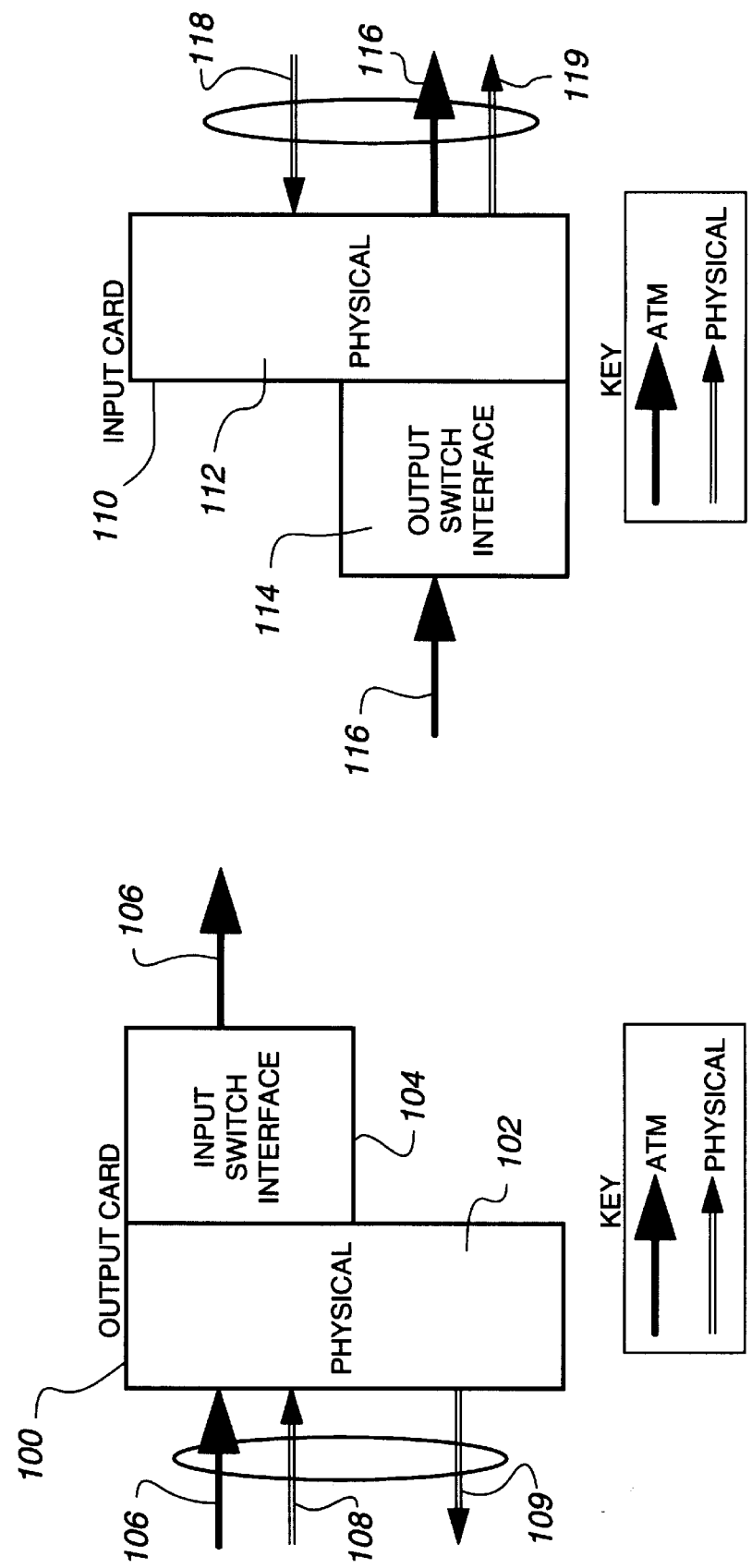
FIGS. 7(a) and 7(b) illustrate input and output line cards for use in unidirectional ATM switches.

FIGS. 7(*a*) and 7(*b*) illustrate line cards for use in unidirectional ATM switches. As shown in FIG. 7(*a*), input line card 100 has two basic components: the physical layer connection (e.g., a SONET (Synchronous Optical Network) OC-3 link) 102 and an input switch interface 104. Arrow 106 indicates the flow of ATM cells into line card 100, and arrows 108 and 109 represent the physical layer interface.

Likewise, FIG. 7(*b*) depicts an output line card 110 with its physical layer connection 112 and output switch interface 114. Arrow 116 represents the flow of ATM cells out of line card 110, and arrows 118 and 119 represent the physical layer interface.

Line cards 100 and 110 may be implemented by modifying a commercially available line card, such as the AT&T Globeview 2000. For example, the input line card 100 can be constructed by removing the output switch interface logic from a conventional line card. The output of the card's idle cell generator will occupy all of the physical layer transmit capacity in that direction. Likewise, the output line card 110 can be constructed by removing the input switch interface logic from a conventional line card.

Figure 8:
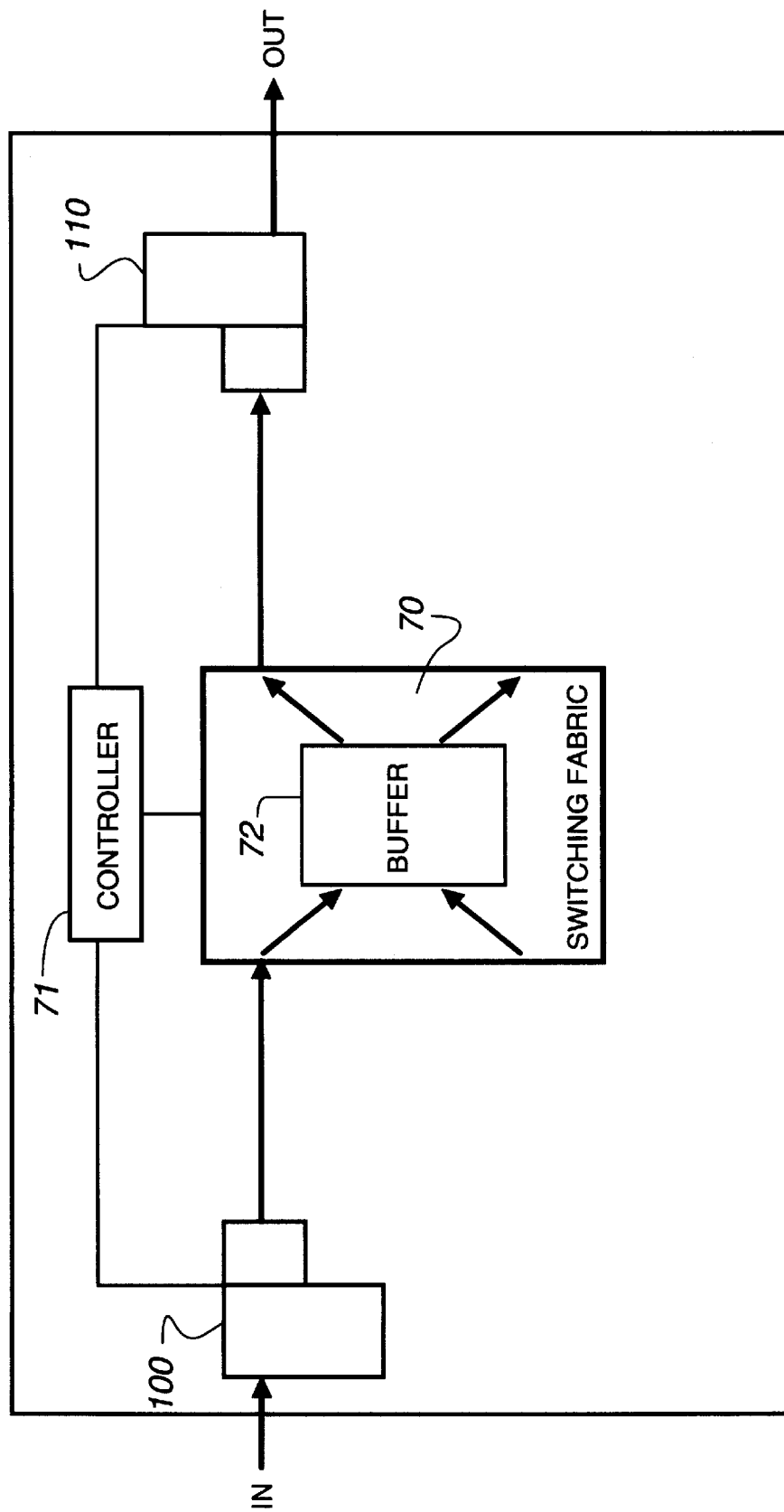
FIG. 8 is a schematic drawing showing input and output line cards in use with an ATM switch.

FIG. 8 is a schematic drawing showing line cards 100 and 110 in use with an ATM switch 20. Once again, it should be understood that in most cases there will be many input and output line cards on the upstream and downstream sides, respectively, of the ATM switch. The ATM switch 20 consists of a switching fabric 70, controller 71 and a buffer 72. The ATM switch interacts with the line card interfaces to route ATM cells according to the routing instructions in the cell headers. Specifically, the controller controls cell routing at the input line card, the switching fabric and the output line card. The physical layer interface to the input and output line cards is not shown in FIG. 8.

Modifications to the invention described above will be apparent to those skilled in the art. All such modifications which do not depart from the spirit and scope of the invention are deemed to be covered by the invention which is limited only by the claims which follow.

What is claimed is:

1. An asymmetrical ATM (asynchronous transfer mode) switch, comprising:

a switching fabric;

a plurality of input line cards;

each of said input line cards having a first number of input connectors for receiving forward data signals, and each of said input line cards being connected to pass the forward signals to said switching fabric;

each of said input line cards having a second number of output connectors connected to receiving reverse data signals from said switching fabric;

said first number being greater than said second number;

a plurality of output line cards;

each of said output line cards having a third number of output connectors connected to receive forward data signals from said switching fabric;

each of said output line cards having a fourth number of input connectors for receiving reverse signals, and each of said output line cards being connected to pass the reverse signals to said switching fabric;

said third number being greater than said fourth number; and a controller connected to control said switching fabric, to control said plurality of input line cards, and to control said plurality of output line cards.

2. The asymmetrical ATM switch of claim 1 including:

a buffer within said switching fabric connected to receive the forward data signals from said plurality of input cards and connected to receive the reverse data signals from said plurality of output line cards.

3. The asymmetrical ATM switch of claim 2:

wherein each of said plurality of input line cards includes an input switch interface connected to pass the forward data signals to said switching fabric;

wherein each of said plurality of input line cards includes an output switch interface connected to receive the reverse data signals from said switching fabric, and wherein said output switch interfaces operates at a data rate that is lower than an operating data rate of said input switch interfaces.

4. The asymmetrical ATM switch of claim 2:

wherein each of said plurality of output line cards includes an input switch interface connected to receive reverse data signals, wherein each of said plurality of output line cards includes an output switch interface connected to receive forward data signals from said switching fabric, and wherein said output switch interfaces operates at a data rate that is higher than an operating data rate of said input switch interfaces.

5. The asymmetrical ATM switch of claim 2 including:

a multiplexer connected to receive reverse data signals from said plurality of output line cards and to pass the reverse data signals to said switching fabric; and a demultiplexer connected to receive reverse data signals from said switching fabric and to pass the reverse data signals to said plurality of input line cards.

6. The asymmetrical ATM switch of claim 2:

wherein each of said plurality of input line cards includes a high data rate input switch interface connected to receive forward data signals;

wherein each of said plurality of input line cards includes a low data rate output switch interface connected to receive reverse data signals from said switching fabric;

wherein each of said plurality of output line cards includes a high data rate output switch interface connected to receive forward data signals from said switching fabric; and wherein each of said plurality of output line cards includes a low data rate input switch interface connected to receive reverse data signals.

7. The asymmetrical ATM switch of claim 6 including:

a multiplexer connected to receive reverse data signals from said plurality of output line cards and to pass the reverse data signals to said switching fabric; and a demultiplexer connected to receive reverse data signals from said switching fabric and to pass the reverse data signals to said plurality of input line cards.

8. A communication network comprising:

a plurality of user stations, each of said user stations including first means for generation a reverse information stream, and each of said user stations including second means for receiving a forward ATM information stream;

an application source including third means for generating a forward ATM information stream, and including fourth means for receiving a reverse information stream;

a unidirectional ATM (asynchronous transfer mode) switch having a upstream side with input connections connected to receive the forward ATM information stream from said application source, and having a downstream side with output connections connected to pass the forward ATM information stream to said second means of said plurality of user stations; and circuit means connecting said first means of said plurality of user stations to said fourth means of said application source.

9. A communication network comprising:

a plurality of user stations, each user station including means for generation a reverse information stream and means for receiving a forward ATM information stream;

an application source including means for generating a forward ATM information stream and means for receiving a reverse information stream;

a symmetrical ATM (asynchronous transfer mode) switch;

said ATM switch having an upstream side with a first plurality of connections connected to receive the forward ATM information stream generated by said application source and a second plurality of connections connected to pass reverse information signals to said application source;

said first plurality being greater in number than said second plurality; and said ATM switch having a downstream side having a third plurality of connections connected to pass said forward ATM information signals to said plurality of user stations and having a fourth plurality of connections connected to receive reverse information from said plurality of user stations;

said third plurality being greater in number than said fourth plurality.

10. The communication network of claim 9 wherein:

said first plurality is equal in number to said third plurality.

11. The communication network of claim 10 wherein:

said second plurality is equal in number to said fourth plurality.

* * * * *